(12) United States Patent  
Kumar et al.

(10) Patent No.: US 9,599,042 B2
(45) Date of Patent: Mar. 21, 2017

(54) START OF INJECTION TIMING

(75) Inventors: Raj Kumar, Elk Grove Village, IL (US); William de Ojeda, Oak Park, IL (US); James Rynold Popp, Oak Creek, WI (US)

(73) Assignee: International Engine Intellectual Property Company, LLC., Lisle, IL (US)

(*) Notice: Subject to any disclaimer, the term of this patent is extended or adjusted under 35 U.S.C. 154(b) by 764 days.

(21) Appl. No.: 13/882,341

(22) PCT Filed: Oct. 28, 2010

(86) PCT No.: PCT/US2010/054387
§ 371 (c)(1),
(2), (4) Date: Apr. 29, 2013

(87) PCT Pub. No.: WO2012/057756
PCT Pub. Date: May 3, 2012

(65) Prior Publication Data
US 2013/0213352 A1  Aug. 22, 2013

(51) Int. Cl.
*F02D 41/00* (2006.01)
*F02D 41/40* (2006.01)
*F02D 41/14* (2006.01)

(52) U.S. Cl.
CPC ........... *F02D 41/00* (2013.01); *F02D 41/401* (2013.01); *F02D 41/144* (2013.01); *F02D 41/1454* (2013.01); *F02D 2200/0406* (2013.01); *Y02T 10/44* (2013.01)

(58) Field of Classification Search
CPC ............... F02D 41/1454; F02D 41/144; F02D 41/0002; F02D 2200/0406; F02D 41/1458; F02D 41/00; F02D 41/401; Y02T 10/44
See application file for complete search history.

(56) References Cited

U.S. PATENT DOCUMENTS

| 8,538,657 B2 * | 9/2013 | Snider ................. F02C 9/26 60/734 |
| 2002/0029768 A1 * | 3/2002 | Matsubara .......... F02D 41/0045 123/500 |
| 2007/0174003 A1 * | 7/2007 | Ueno .................. F02D 41/0002 701/104 |
| 2009/0306877 A1 * | 12/2009 | Sasaki ................. F02D 41/182 701/104 |

* cited by examiner

*Primary Examiner* — Sizo Vilakazi
(74) *Attorney, Agent, or Firm* — Jack D. Nimz; Jeffrey P. Calfa

(57) ABSTRACT

A method for controlling fuel injection timing into a cylinder of an internal combustion engine having an internal control system based on ignition delay correlation wherein intake manifold pressure and oxygen concentration values are compared to steady state values of manifold pressure and oxygen concentration of a particular indicated torque setpoint and engine speed. Comparing intake manifold pressure and oxygen concentration to steady state reference values further comprises experimentally determining exponential factors for intake manifold pressure factor and oxygen concentration factors. A multiplier for intake manifold pressure and oxygen concentration is determined taking into consideration the exponential factors for manifold pressure and oxygen concentration. An equation for correlation ignition delay is used to determine optional SOI timing.

17 Claims, 8 Drawing Sheets

START OF INJECTION TIMING

FIELD OF THE INVENTION

This invention relates to internal combustion engines, including but not limited to the timing of fuel injection.

BACKGROUND OF THE INVENTION

Most modern diesel engines, particularly diesel engines for large tractor-trailer trucks, use fuel injectors to deliver a desired fuel charge to an engine cylinder. The fuel injector is a nozzle which injects fuel, atomized by forcibly pumping fuel through the nozzle at high pressure, directly into the combustion chamber of each cylinder. A fuel injector, particularly a fuel injector for use with a diesel engine, is required to accurately discharge a quantity of fuel into a combustion chamber of an internal combustion engine over a wide range of engine operating conditions.

Fuel is injected into the combustion chamber during the final stage of compression. The high degree of compression heats the air such that the heat initiates combustion of the fuel when the fuel is injected into the chamber. The fuel injector ensures that fuel is injected in fine droplets to allow for even distribution, which enhances efficiency of the combustion process and results in improved engine performance.

The start of injection (SOI) is determined by the fuel injection timing of the fuel system, often controlled by an engine control unit (ECU). SOI timing is an important factor in lowering emissions and improving engine efficiency. Timing of the SOI is measured in degrees of the crank angle of the piston before top dead center (BTDC), which is the highest position the piston reaches in the cylinder. The ECU receives input on engine operating conditions such as the engine speed, indicated torque, intake manifold pressure, oxygen concentration, and fuel temperature. Based on the engine operating conditions, the ECU determines an optimal SOI time to maximize power and efficiency while minimizing emissions.

In many engines, exhaust gas recirculation (EGR) rates are decreased during transient operation to avoid engine misfire, usually due to a decreased air to fuel ratio as a result of turbocharger delay. However, because stricter emission standards do not allow for such decreased EGR rates, attempts are made to shift injection timing to avoid engine misfire. Under-advanced SOI timing, or delaying start of injection, causes incomplete combustion, produces unburned hydrocarbons and poor fuel efficiency due to late combustion phasing. Current technology typically advances injection timing significantly during transient operation causing engine misfire. Overly-advanced SOIs, or injecting before the piston reaches TDC, can result in higher in-cylinder pressure and temperature, and higher efficiency, but also results in elevated engine noise and excess nitrous oxide (NOx) production.

The present inventors have recognized that SOI timing can be derived from correlations of ignition delay and information based on steady state engine operating conditions which are readily achieved in an experimental setting. Because the engine is often subject to conditions when ideal correlations cannot be maintained, timing SOI during transient operating conditions based on an ignition delay correlation can optimize engine performance.

The present inventors have recognized the need for a method of improving injection timing control to decrease engine misfire, and to avoid excessively advanced combustion.

The present inventors have recognized the need for an engine management system that enables the operation of an engine with high levels of EGR and late combustion timings while containing misfiring events.

The present inventors have recognized that SOI compensation based on ignition delay correlation can contain combustion phasing under transient operating conditions.

SUMMARY OF THE INVENTION

According to an exemplary embodiment of the present invention, an engine management system for controlling start of injection (SOI) timing adjusts SOI based on steady state reference values to maintain a targeted combustion phasing (CA50) despite intake manifold conditions significantly different from calibrated values due to transient operating conditions, and other operating variabilities.

A method for controlling SOI for an engine having an engine management system based on correlations of ignition delay, comprises the steps of: acquiring a measurement of, or an estimate of, intake manifold pressure (MAP), acquiring a measurement of, or an estimate of, intake manifold oxygen concentration ($X_{O2}$), comparing the intake manifold pressure (MAP) and the intake oxygen concentration ($X_{O2}$) to steady state reference tabulated values ($MAP_{ss}$ and $X_{O2,ss}$), and prescribing a compensated SOI timing based on reference tabulated ignition delay values.

The steps of acquiring intake manifold pressure and acquiring intake manifold oxygen concentration are accomplished through direct or indirect measuring techniques. Direct techniques, such as the use of an oxygen or pressure sensor, or indirect techniques such as the use of theoretical calculations known to one skilled in the art, can be used.

Intake manifold pressure at transient conditions is compared to steady state intake manifold pressure by taking the ratio of the two values ($MAP/MAP_{ss}$) to determine the intake manifold pressure compensation factor. The intake manifold pressure compensation factor represents the MAP value relative to the steady state MAP reference value ($MAP_{ss}$). The intake manifold pressure compensation factor is raised exponentially to a power of intake manifold pressure exponential factor to determine the intake manifold pressure multiplier. Likewise, the intake manifold oxygen concentration at transient conditions is compared to steady state intake manifold oxygen concentration by taking the ratio of the two values ($X_{o2}/X_{o2ss}$) to determine the oxygen concentration compensation factor. The oxygen concentration factor is raised exponentially to the power of an oxygen concentration exponential factor to determine the oxygen concentration multiplier.

To prescribe a compensated SOI timing, an ignition delay crank angle ratio is correlated to the product of the intake manifold pressure multiplier and the oxygen concentration multiplier according to the following equation:

$$\frac{CA50_{SP} - SOI}{CA50_{SS} - SOI_{SS}} \approx \left(\frac{MAP}{MAP_{SS}}\right)^{-0.7} \cdot \left(\frac{X_{O2}}{X_{O2,SS}}\right)^{-1.2}$$

In one embodiment, the crank angle ratio is obtained by taking the ratio of the difference between a reference combustion phasing crank angle at steady state ($CA50_{ss}$) and the SOI at transient conditions (SOI) to the difference between the reference combustion phasing crank angle at steady state ($CA50_{ss}$) and the SOI at steady state conditions ($SOI_{ss}$). The reference combustion phasing crank angle is preferably the crank angle at which 50% of maximum fuel burning occurs in the combustion chamber under steady state conditions ($CA50_{ss}$). Thus, by identifying the intake manifold pressure multiplier, the oxygen concentration multiplier, and the crank angle ratio, SOI timing can accordingly be determined.

Numerous other advantages and features of the present invention will be become readily apparent from the following detailed description of the invention and the embodiments thereof, from the claims and from the accompanying drawings.

DETAILED DESCRIPTION

Figure 1:
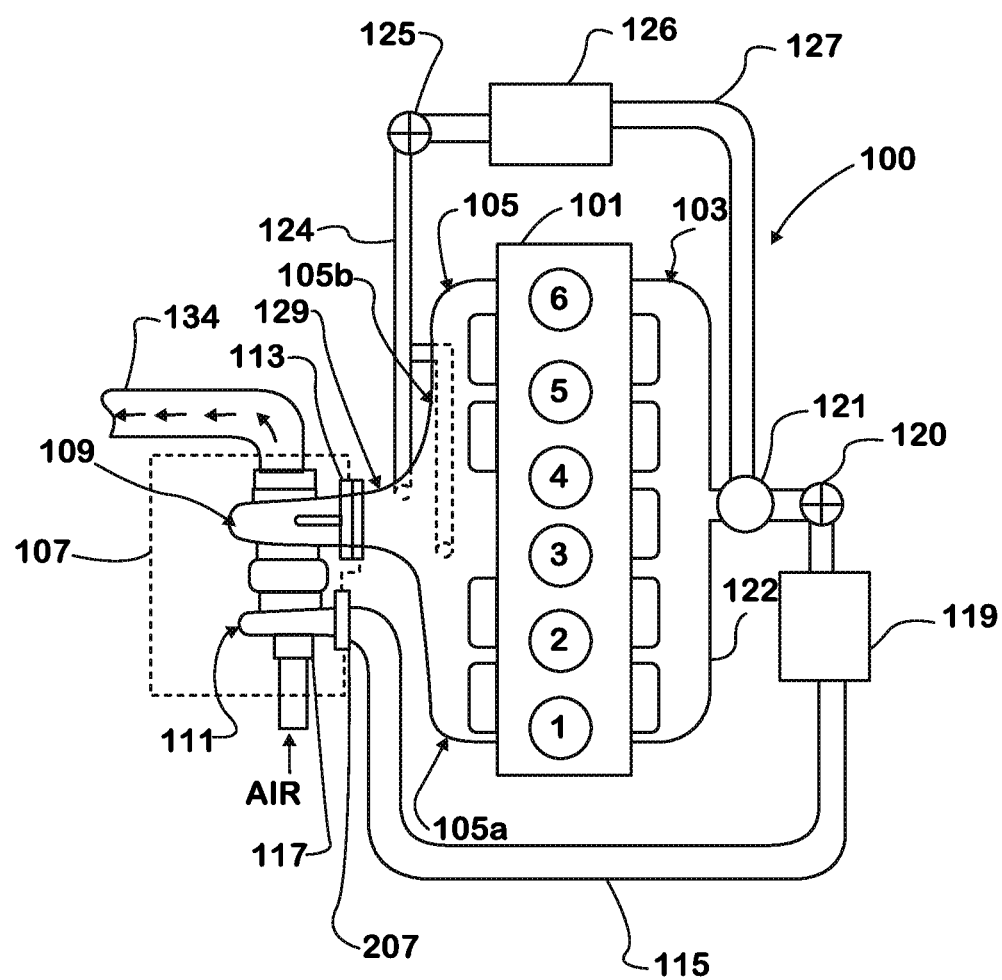
FIG. 1 is a schematic diagram of an engine system that includes a turbocharger in accordance with an exemplary embodiment of the invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

An engine 100 is shown schematically in FIG. 1. The engine 100 has a block 101 that includes a plurality of cylinders. The cylinders in the block 101 are fluidly connected to an intake system 103 and to an exhaust system 105. The exhaust system includes a first pipe 105a from cylinders 1, 2 and 3 of one bank of cylinders and a second pipe 105b from cylinders 4, 5 and 6. Although an inline arrangement of six cylinders is illustrated, inline or V-arrangements or other arrangements of plural cylinders of any number of cylinders are also encompassed by the invention.

A turbocharger 107 includes a turbine 109. The turbine 109 shown has a single turbine inlet port 113 connected to the exhaust system 105. The turbocharger 107 includes a compressor 111 connected to the intake system 103 through an inlet air passage 115.

During operation of the engine 100, air may enter the compressor 111 through an air inlet 117. Compressed air may exit the compressor 111 through a discharge nozzle 207, pass through the inlet air passage 115, and pass through an optional charge air cooler 119 and an optional inlet throttle 120 before entering an intake air mixer 121 and an intake air manifold 122 of the intake system 103. The compressed air enters the engine cylinders 1-6.

A stream of exhaust gas from the exhaust system 105 may be routed through an EGR passage or conduit 124, through an exhaust gas recirculation (EGR) valve 125, through an exhaust gas recirculation (EGR) cooler 126 and pass through a further EGR conduit 127 before meeting and mixing with air from the inlet throttle 120 at the mixer 121.

The inlet port 113 of the turbine 109 may be connected to the exhaust pipes 105a, 105b in a manner that forms a divided exhaust manifold 129. Exhaust gas passing through the turbine 109 may exit the engine 100 through a tailpipe 134. Emissions and sound treating components can be arranged to receive the exhaust gas from the tailpipe, before exhausting to atmosphere, as is known.

Figure 1A:
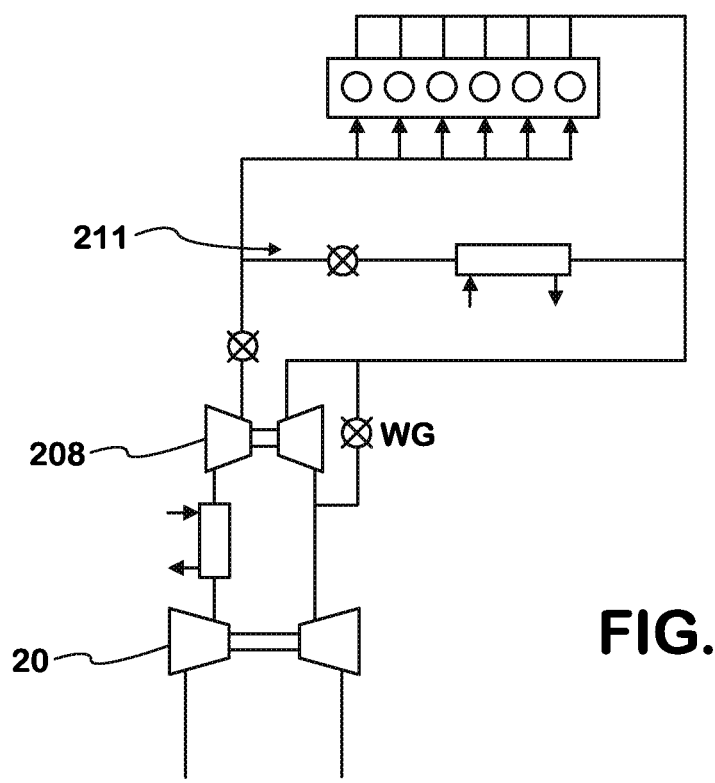
FIG. 1A is a schematic diagram of a dual stage turbocharger engine system that comprises a high pressure EGR loop.

At times when the EGR valve 125 is at least partially open, exhaust gas flows through pipes 105a, 105b, through the conduit 124, through the EGR valve 125, through the EGR cooler 126, through the further conduit 127 and into the mixer 121 where it mixes with air from the inlet throttle 120. An amount of exhaust gas being re-circulated through the EGR valve 125 may depend on a controlled opening percentage of the EGR valve 125. FIG. 1A illustrates an engine comprising two turbochargers, a high pressure turbocharger 208, and a low pressure turbocharger 209, as well as a high pressure EGR loop 211.

Figure 2:
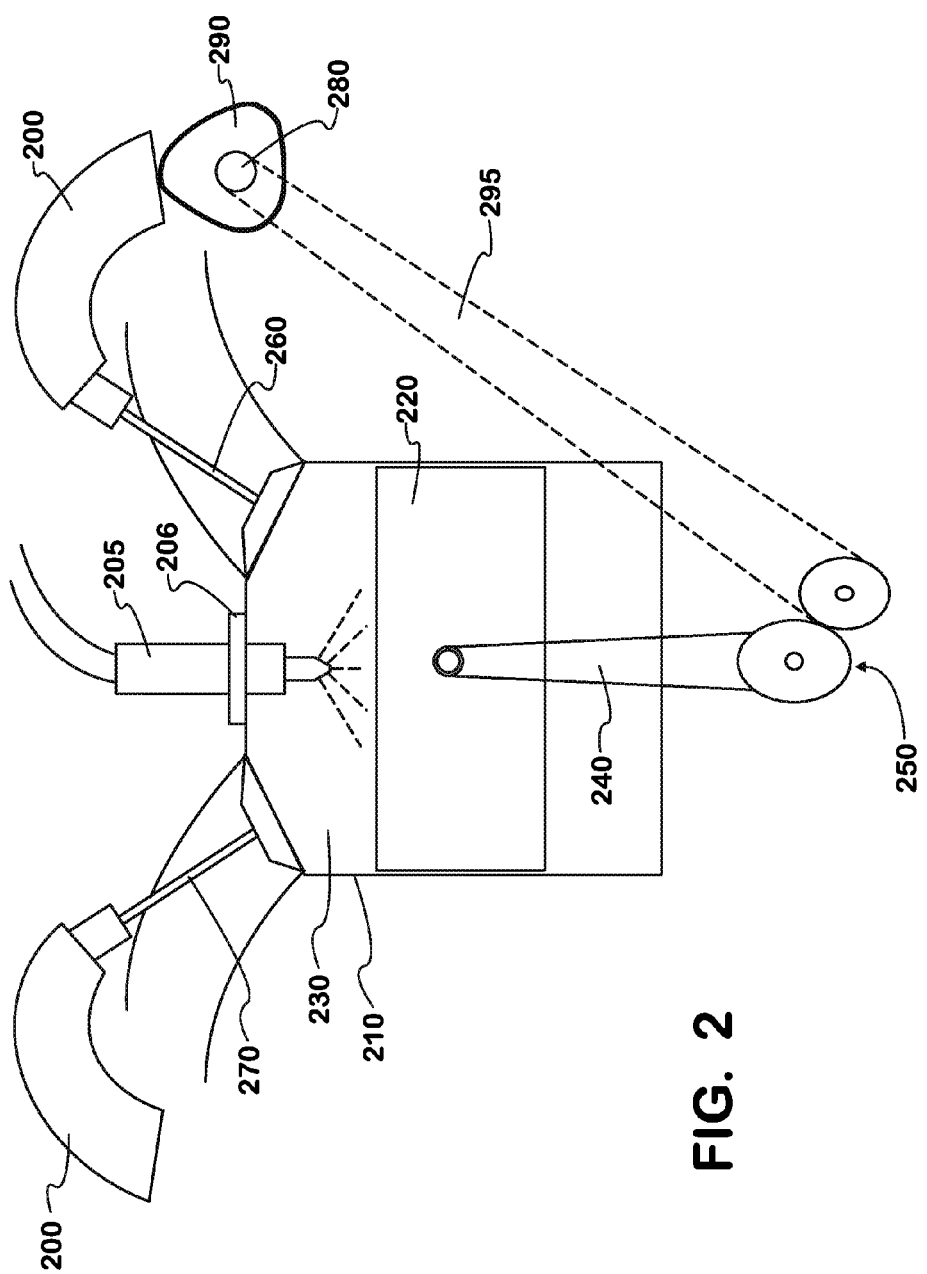
FIG. 2 is a schematic diagram of a cylinder in an internal combustion engine.

A cylinder 210 in an internal combustion engine is illustrated in FIG. 2. A piston 220 in the cylinder reciprocates and defines engine strokes. A combustion chamber 230 is defined by the cylinder head above the piston and within the cylinder 210. The piston 220 is connected by a connecting rod 240 to a crankshaft 250, which in turn is connected to a drive chain 295 which drives a cam shaft 280. The cam shaft 280 drives a cam 290.

Inlet valve 260 and exhaust valve 270 are disposed on top of the cylinder 210, and are driven in a timed relationship to the movement of the piston 220. Inlet valve 260 and exhaust valve 270 are connected to rocker arms 200, which are each in contact with a cam 290 (not shown for inlet valve 270). The opening and closing of the valves 260, 270 is controlled by the movement of the rocker arm 200. Because the rocker arm is in connection with the piston via the cam 290, cam shaft 280, crankshaft 250 and connecting rod 240, the opening and closing of the valves 260, 270 is dependent on the movement of the piston 220, and can be timed relative to the movement of the piston 220.

The internal combustion engine of FIG. 2 comprises a fuel injection system. The fuel injection system comprises a fuel injector 205, held in place on the top of the cylinder 210 by a clamping mechanism 206. The fuel injector 205 injects atomized fuel into the combustion chamber 230. An engine management system comprising an engine control unit (ECU) 400 (FIG. 3) controls the timing and amount of fuel that is injected into the combustion chamber 230. Start of injection is measured in degrees of the crank angle of the piston relative to the top dead center position of the piston. Start of injection (SOI) occurs during a certain crank angle, such as, for example 30 degrees before top dead center (BTDC).

Figure 3:
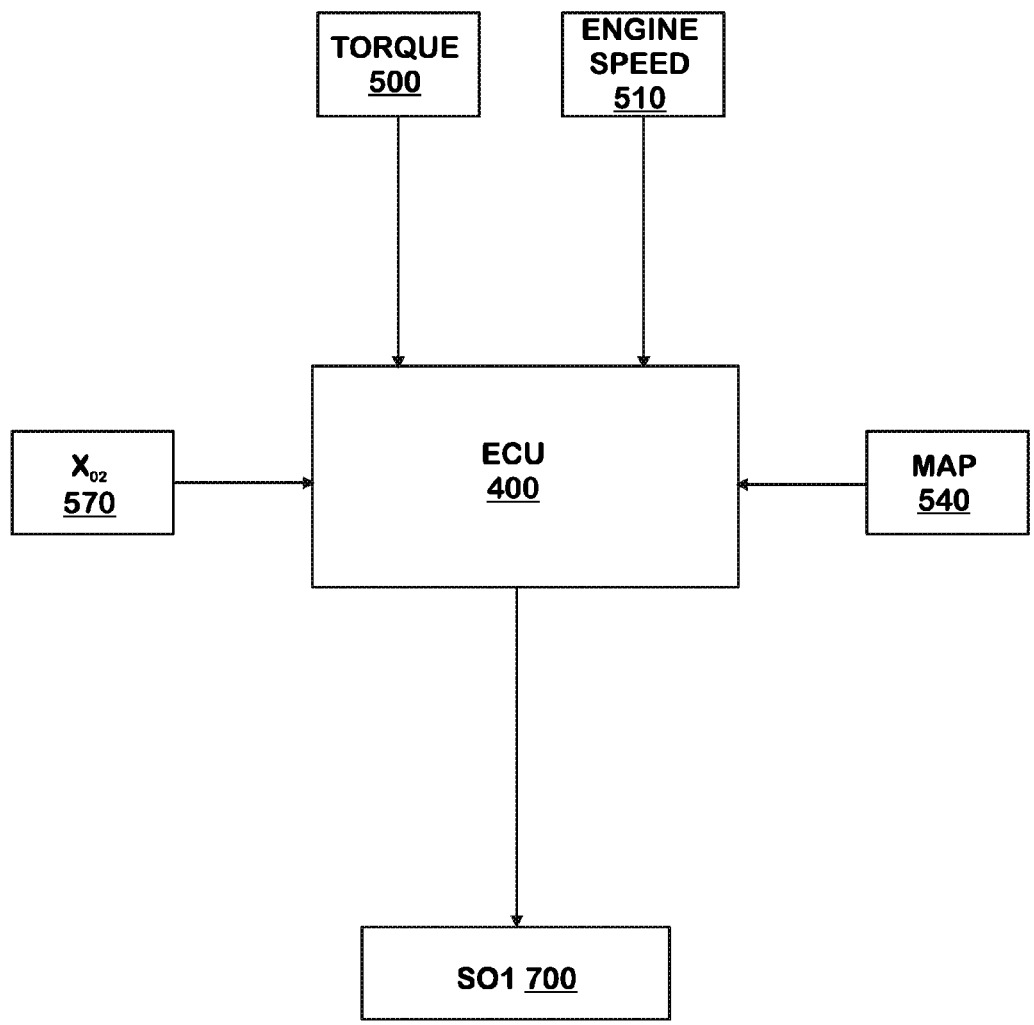
FIG. 3 is a schematic diagram illustrating informational inputs into the engine control unit.

The SOI is initiated by the ECU 400. In one embodiment, the ECU compensates for SOI timing under transient operating conditions using physical information available through an estimate of intake manifold conditions and engine operating conditions. Information on intake manifold conditions, such as manifold pressure 540 and oxygen concentration 570, as well as information on engine operating conditions such as indicated torque set-point 500 and engine speed 510, are transmitted to the ECU 400 for processing as illustrated in FIG. 3. The ECU 400 calculates, based on the information it receives, the optimal timing for SOI 700 under the set of engine operating conditions to maintain target combustion phasing (CA50) in order to avoid misfire and the NOx penalty associated with overly advanced combustion phasing.

Motivation for SOI compensation based on ignition delay correlation relies on classic ignition delay expressions described in academic combustion literature, such as that described by Heywood (Equation 1.) in J. B. Heywood, "Internal Combustion Engine Fundamentals", International Edition, McGraw-Hill, Inc., 1988, expressed as:

$$\tau = Ap^{-n}\exp\left(\frac{E_A}{RT}\right). \quad \text{Equation 1}$$

Where t is in microseconds,
A and n are adjustable constants,
p is ambient pressure,
$E_A$ is activation energy,
R is the universal gas constant, and
T is temperature.

Recent investigation into low temperature combustion, reported in S. Kook, C. Bae, P. C. Miles, D. Choi, and L. M. Pickett, "The Influence of Charge Dilution and Injection Timing on Low-Temperature diesel Combustion and Emissions", SAE Paper 2005-01-3837, 2005, has led to new forms of ignition delay correlation, (Equation 2.) expressed as:

$$\tau = 12.254 \overline{p}^{-1} \cdot X_{O2}^{-1.2} \cdot e^{E_A/RT_a} \quad \text{Equation 2.}$$

Where p is average ambient pressure and $T_a$ is average temperature, and the other parameters are defined above.

Based on such known correlations of ignition delay, ignition delay correlations equations which can be used to identify SOI timing, can be derived. SOI compensation is formulated according to comparison with reference, in this case, steady state, based on the equation (Equation 3.):

$$\frac{CA50_{SP} - SOI}{CA50_{SS} - SOI_{SS}} \approx \left(\frac{MAP}{MAP_{SS}}\right)^{-0.7} \cdot \left(\frac{X_{O2}}{X_{O2,SS}}\right)^{-1.2}. \quad \text{Equation 3}$$

This method of SOI compensation is based on known correlations of ignition delay, such as those expressed by the above Equation 1. or Equation 2., and detailed information on experiments in research engines often obtained under ideal conditions which optimize the fuel/air mixture. In operation, the engine is often subjected to conditions where such ideal conditions cannot be maintained, thus absolute values for ignition delay will not hold. However, information gained from steady-state, ideal operating conditions can serve as a reference for determining SOI timing. As illustrated by the equation above, it is the ratio of ignition delay that is correlated to intake manifold pressure and oxygen concentration.

Ignition delay refers to the time period between the beginning or end of injection, and a time point in the combustion process, such as the beginning of combustion. Intake manifold conditions, such as intake manifold pressure (MAP), and oxygen concentration ($X_{O2}$) are some of the parameters for which ignition delay correlation data can be collected for a particular engine. Because ignition delay is dependent on the air/fuel mixture ratio, parameters such as pressure and oxygen concentration which proscribe how much air enters the cylinder, play an important role.

In one embodiment, as represented by the ignition delay correlation equation above, the ignition delay is measured between the injection and point during the combustion process wherein 50% of the fuel has been used for combustion.

Ignition delay values can be obtained for steady state (SS) reference values of intake manifold pressure ($MAP_{ss}$), oxygen concentration ($X_{O2ss}$), baseline start of injection ($SOI_{ss}$) and combustion phasing ($CA50_{ss}$) for a particular engine or engine type by subjecting the engine to steady state operating conditions at a desired torque strength and engine speed and gathering experimental data for correlation.

Combustion phasing tracks the beginning to the end of combustion process by determining the intensity of heat release, which is indicative of the combustion process. Combustion phasing is expressed by the crank angle at which a certain amount of fuel has been burnt. CA50ss is the crank angle at which 50% of the fuel is burnt under steady state ideal condition. Other crank angles may be used with other ignition delay correlation equations.

Figure 4:
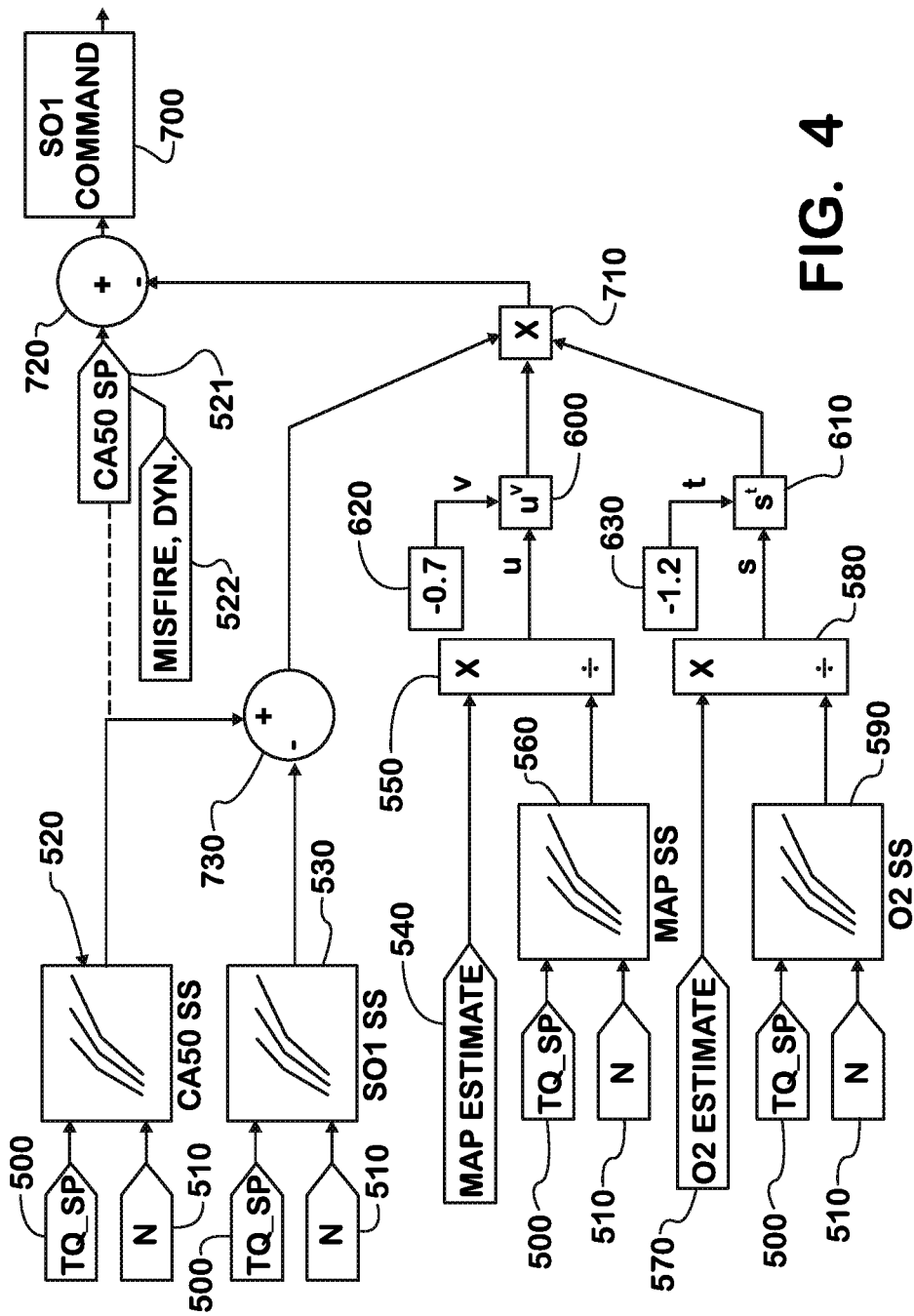
FIG. 4 is a flow diagram illustrating an exemplary embodiment of a method for compensating SOI based on ignition delay correlation.

Based on the crank angle at which 50% of the fuel is burnt ($CA50_{ss}$) at steady state, and known ignition delay correlation, an optimal time for SOI at transient operating conditions to reach target combustion phasing is determined according to the flow chart illustrated in FIG. 4.

The ECU (not shown in FIG. 4) processes information pertaining to manifold pressure 540, oxygen concentration 570, indicated torque set-point 500, and engine speed 510 according to the flow chart to determine the crank angle at which fuel injection should begin. The flow chart illustrates the steps required to generate the SOI command sent out by the ECU according to the following equation:

$$\frac{CA50_{SP} - SOI}{CA50_{SS} - SOI_{SS}} \approx \left(\frac{MAP}{MAP_{SS}}\right)^{-0.7} \cdot \left(\frac{X_{O2}}{X_{O2,SS}}\right)^{-1.2}. \quad \text{Equation 3}$$

The ECU 400 receives input on engine operating conditions, particularly an indicated torque set-point 500 and engine speed signal 510. For a certain indicated torque set-point 500 and engine speed signal 510, the crank angle at which 50% fuel is burnt at steady state conditions (CA50ss) is identified at step 520. While it is typically desirable for the engine to run at steady-state (SS) targets for CA50, provision must be identified to allow the set-point itself to deviate from steady-state values during dynamic situations or misfire. Using $CA50_{ss}$, a correction can be made at step 521 based on dynamic situations or misfires, represented as input 522. During normal operating conditions $CA50_{ss}$ will be equal to $CA50_{sp}$.

Indicated torque is essentially the useful torque being produced by the engine, corresponding to the torque at the clutch for propelling the vehicle plus torques used for other purposes such as operating a torque converter and engine-driven accessories like alternators and fuel pumps, and overcoming engine rotating friction. Typically the indicated torque set-point is derived by observing the fuel quantity injected for torque generation along with engine speed.

Therefore, the indicated torque set-point is tabulated in a two-dimensional table with inputs of engine speed and fuel quantity injected for torque generation. Methods used for linking accelerator pedal position, injected fuel quantity for torque, and indicated torque set-point are known to one of skill in the art.

Engine speed is measured in known fashion such as by using a proximity sensor adjacent to a flywheel.

The $SOI_{ss}$ reference value based on steady state experimental testing are also identified at step 530 based on the indicated torque set-point 500 and engine speed signal 510.

The $MAP_{ss}$ reference value based on steady state experimental testing are also identified at step 560 based on the indicated torque set-point 500 and engine speed signal 510.

The $X_{O2ss}$ reference value based on steady state experimental testing are also identified at step 590 based on the indicated torque set-point 500 and engine speed signal 510.

The flow chart illustrates that at a particular indicated torque set-point 500 and engine speed signal 510, combustion phasing angle—in this case $CA50_{ss}$, and $SOI_{ss}$ reference values at steady state is retrieved by the ECU for use in determining the SOI timing. A MAP value 540 under transient operating conditions is obtained for comparison at step 550 with reference values for $MAP_{ss}$ from step 560 at a particular indicated torque set-point 500 and engine speed signal 510.

Figure 5A:
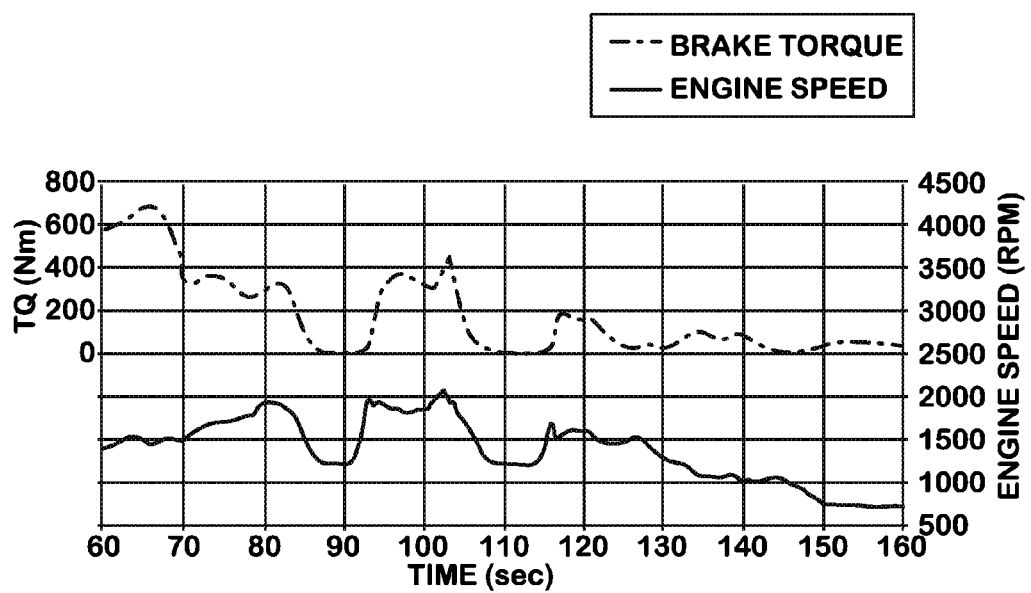
FIG. 5A illustrates sample transient engine speed and load conditions.

FIG. 5A illustrates a sample of speed and torque profiles for an engine operating under transient conditions as a function of time.

Figure 5B:
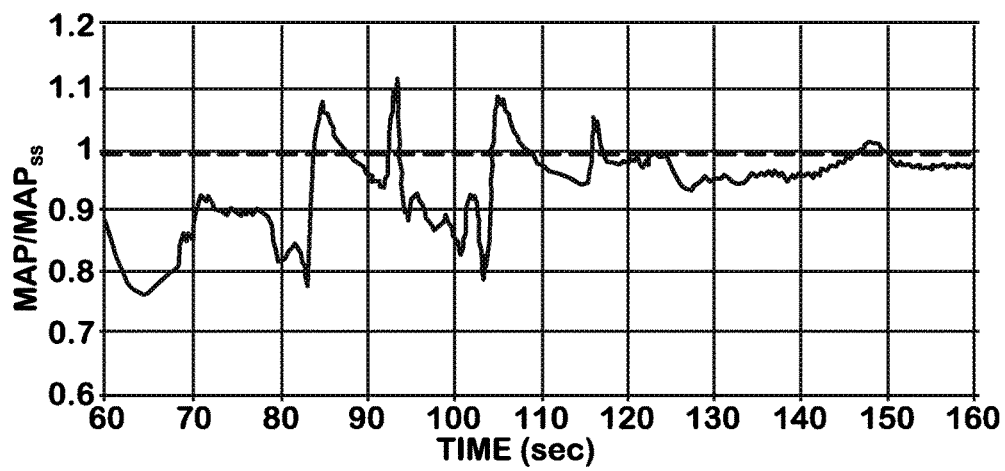
FIG. 5B illustrates intake manifold pressure (MAP) normalized by calibrated steady-state values.

FIG. 5B compares estimates of intake manifold pressure (MAP) with steady-state tabulated values ($MAP_{ss}$) for an engine operating under transient conditions as a function of time. Ratios below a value of 1 signify intake manifold pressures lower than the reference values, while ratios above 1 signify that intake manifold pressure (MAP) is above reference values.

Likewise, an oxygen concentration value ($X_{O2}$) 570 for the engine under transient operating conditions is obtained for comparison at step 580 to reference values for oxygen concentration at steady state ($X_{O2ss}$) step 590 for a particular indicated torque set-point 500 and engine speed signal 510.

Figure 5C:
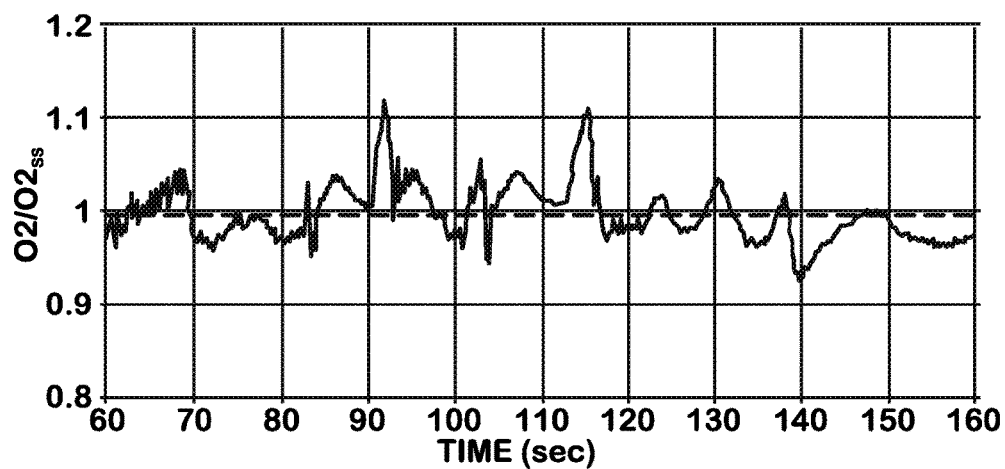
FIG. 5C illustrates estimated intake manifold oxygen concentration ($X_{O2}$)

FIG. 5C compares estimates of intake oxygen concentration ($X_{O2}$) with steady-state tabulated values ($X_{O2ss}$) for an engine operating under transient conditions as a function of time. Ratios below a value of 1 signify oxygen concentration lower than reference values, while ratios above 1 signify oxygen concentrations higher than reference values.

The step 550 of comparing the MAP to $MAP_{ss}$, and the step 580 of comparing $X_{O2}$ to $X_{O2ss}$ comprise taking the ratios of the MAP and $X_{O2}$ to the $MAP_{ss}$ and $X_{O2ss}$, respectively. The ratio of $MAP/MAP_{ss}$ is the intake manifold pressure compensation factor "U," and the ratio of $X_{O2}/X_{O2ss}$ is the oxygen concentration factor "S". The intake manifold pressure compensation factor U is raised exponentially to an intake manifold pressure compensation exponential factor "v" at an intake manifold pressure multiplier step 600. The oxygen concentration factor S is raised exponentially to an oxygen concentration exponential factor "t" at an oxygen concentration multiplier step 610. The intake manifold pressure compensation exponential factor v and the oxygen concentration exponential factor t are experimentally derived inputs 620, 630 for a particular engine or for engine types with similar characteristics. Data points are collected for a particular engine or engine type, wherein a best fit curve is generated and the exponential factors are derived as known to one skilled in the art. In one embodiment, the intake manifold pressure compensation exponential factor v is −0.7 and the oxygen concentration exponential factor t is −1.2.

The MAP signal 540 is an estimate of the intake manifold pressure, or a direct measurement of the intake manifold pressure, such as by using a pressure sensor. The $X_{O2}$ signal 570 is an estimate the intake manifold oxygen concentration, or a direct measurement of intake manifold oxygen concentration, such as by using an oxygen sensor.

The ratio of the difference between $CA50_{sp}$ and SOI and the difference between $CA50_{ss}$ and $SOI_{ss}$, expressed as $(CA50_{sp}-SOI)/(CA50_{ss}-SOI_{ss})$ is correlated to the product of the intake manifold pressure multiplier and the oxygen compensation multiplier in the ignition delay equation above (Equation 3.).

The SOI determined in step 530 is subtracted from the steady state crank angle CA50ss determined in step 520 $(CA50_{ss}-SOI_{ss})$ at a step 730. At a step 710, the difference $(CA50_{ss}-SOI_{ss})$ calculated at step 730 is multiplied by the intake manifold pressure multiplier and the intake oxygen concentration multiplier calculated in steps 600, 610. The resulting value from step 710 can then be subtracted in a step 720 from the CA50ss value determined from step 520 to issue an SOI command step 700 sent to the fuel injector to begin fuel injection at the appropriate timing.

Figure 5D:
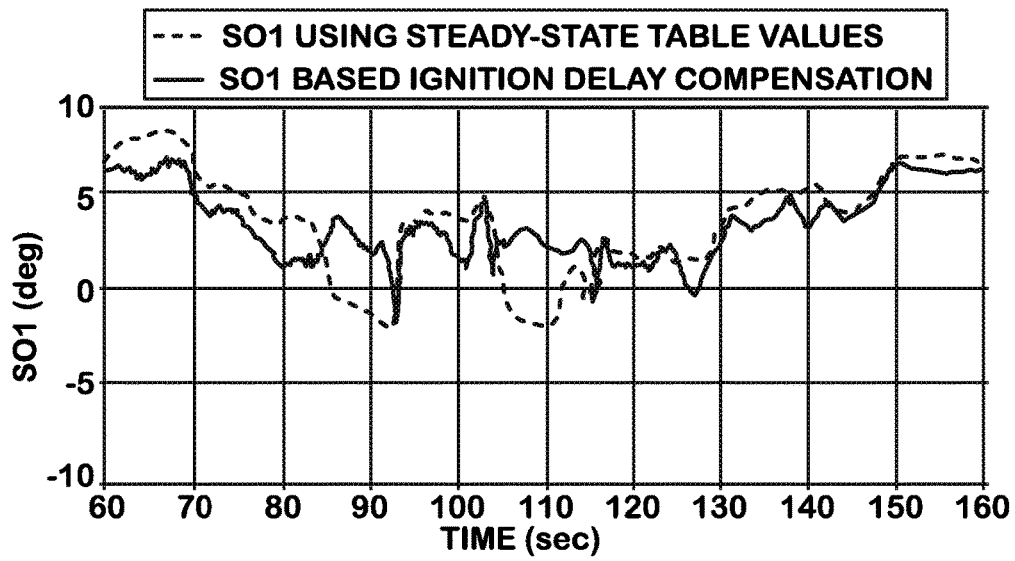
FIG. 5D illustrates a comparison of start of injection with and without ignition delay compensation.

FIG. 5D compares reference SOI values with SOI based on ignition delay compensation for an engine operating under transient conditions as a function of time.

Figure 5E:
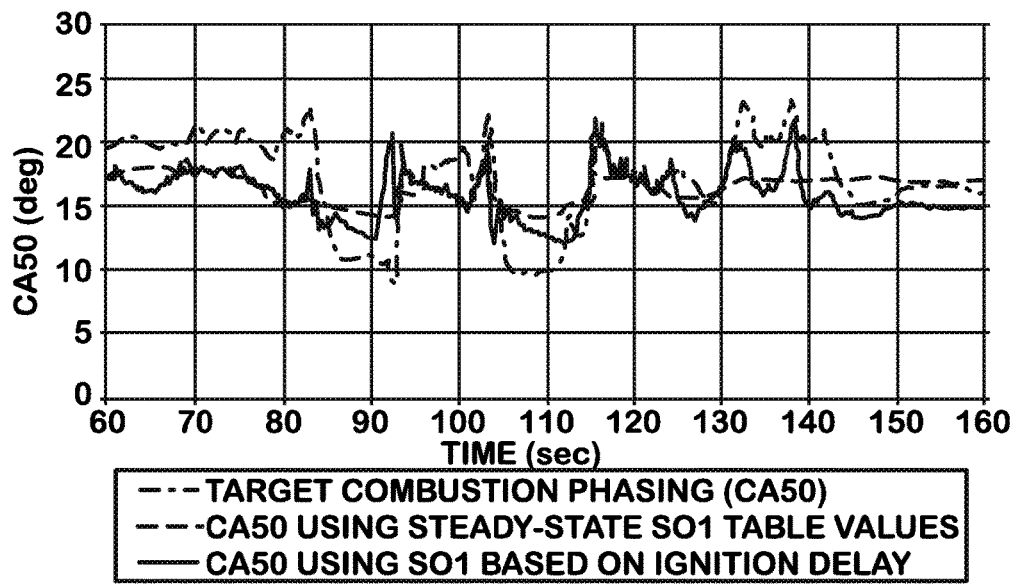
FIG. 5E compares combustion phasing (CA50) using start of injection strategy with and without ignition delay compensation.

FIG. 5E compares combustion phasing of SOI strategies with and without ignition delay compensation to target combustion phasing for an engine operating under transient conditions as a function of time. FIG. 5E illustrates that the SOI compensation based on ignition delay correlation is able to maintain combustion phasing during a selected portion of a transient cycle by adjusting the SOI. Combustion phasing (CA50) ahead of the targeted values result in a $NO_x$ penalty, while excessively retarded phasing risks misfire due to decreased stability. As illustrated in FIG. 5E, CA50 using SOI based on ignition delay follows target combustion phasing more closely than CA50 using steady-state reference values.

In operation, the ECU receives input regarding the indicated torque, the engine speed, MAP measurement or estimate and the O2 measurement or estimate. For the particular combination of indicated torque and engine speed, steady state values for desired combustion phasing, CA50ss, steady state values for SOI-SOIss, steady state values for MAP-$MAP_{ss}$, and steady state values for oxygen concentration XO2 are used as a reference. The MAP value and the O2 value at transient conditions are supplied to the ECU to perform calculations according to the SOI compensation equation above (Equation 3.) to arrive at an optimal SOI under occurring transient operating conditions.

Thus, by identifying the intake manifold pressure multiplier, the oxygen concentration multiplier, and the crank angle ratio, the SOI can accordingly be determined.

PARTS LIST 100 engine
101 block
103 intake system
105 exhaust system
105a first exhaust pipe
105b second exhaust pipe
107 turbocharger
109 turbine 111 compressor
113 inlet port
115 inlet air passage
117 air inlet
119 optional charge air cooler
120 optional inlet throttle
121 inlet air mixer
122 intake manifold
124 EGR conduit
125 EGR valve
126 exhaust gas recirculation cooler
127 conduit
129 divided exhaust manifold
134 tailpipe
200 rocker arm
205 fuel injector
206 clamping mechanism
207 discharge nozzle
208 high pressure turbocharger
209 low pressure turbocharger
210 cylinder
211 high pressure EGR loop
220 piston
230 combustion chamber
240 connecting rod
250 crankshaft
260 valve
270 valve
280 cam shaft
290 cam
295 drive chain
400 engine control unit
500 indicated torque set-point
510 engine speed signal
520 step of determining $CA50_{ss}$ steady state crank angle
521 step of determining $CA50_{sp}$
522 input to step 521
530 step of determining $SOI_{ss}$ start of ignition
540 manifold pressure
550 comparison of MAP to $MAP_{ss}$
560 step of determining $MAP_{ss}$
570 step of determining oxygen concentration
580 step of comparison of $X_{O2}$ to $X_{O2,SS}$
590 step of determining $X_{O2ss}$
600 intake manifold pressure multiplier step
610 oxygen concentration multiplier step
620 intake manifold pressure compensation exponential factor
630 oxygen concentration exponential factor
700 Start Of Injection Command
710 step of multiplying $(CA50_{ss}-SOI_{ss})$ with the intake manifold pressure multiplier and the intake oxygen concentration multiplier
720 step of subtracting value resulting from 710, from $CA50_{sp}$
730 step of subtracting $SOI_{ss}$ from $CA50_{ss}$ From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A method for controlling fuel injection timing into a cylinder of an internal combustion engine having an internal control system comprising the steps of:
    acquiring an indicated torque set-point;
    determining engine speed;
    acquiring intake manifold pressure;
    acquiring intake manifold oxygen concentration;
    comparing the intake manifold pressure to steady state reference values for intake manifold pressure at the indicated torque set-point and the engine speed and based on the comparison determining an intake manifold pressure multiplier;
    comparing the oxygen concentration to steady state reference values for oxygen concentration at the indicated torque set-point and the engine speed and based on the comparison determining an oxygen concentration multiplier; and
    based on the intake manifold pressure multiplier, the oxygen concentration multiplier, calculating a compensated start of injection timing.

2. The method of claim 1, comprising the further step of determining steady state reference ignition delay values based on indicated torque set-point and engine speed; and
    wherein the step of calculating a compensated start of injection timing is further defined in that the steady state reference ignition delay values are modified by the intake manifold pressure multiplier and the oxygen concentration multiplier to determine the compensated start of injection timing.

3. The method of claim 1, where the step of acquiring intake manifold oxygen concentration is further defined in that the intake manifold oxygen concentration is directly measured.

4. The method of claim 1, where the step of acquiring intake manifold oxygen concentration is further defined in that the intake manifold oxygen concentration is calculated.

5. The method of claim 1, where the step of acquiring intake manifold pressure is further defined in that the intake manifold pressure is directly measured.

6. The method of claim 1, where the step of acquiring intake manifold pressure is further defined in that the intake manifold pressure is calculated.

7. The method of claim 1, wherein the step of comparing the intake manifold pressure to steady state reference values for manifold pressure comprises taking the ratio of the intake manifold pressure to the steady state reference values for manifold pressure at the indicated torque set-point and engine speed determined.

8. The method of claim 1, wherein the step of comparing the intake manifold oxygen concentration to steady state reference values comprises taking the ratio of the estimate of intake manifold oxygen concentration to the steady state reference values for manifold pressure at the indicated torque and engine speed determined.

9. The method of claim 1, comprising the further step of determining steady state reference ignition delay values based on indicated torque set-point and engine speed; and
    wherein the step of calculating a compensated start of injection timing is further defined in that the steady state reference ignition delay values are modified by the intake manifold pressure multiplier and the oxygen concentration multiplier to determine the compensated start of injection timing;
    wherein the step of comparing the intake manifold pressure to steady state reference values for manifold pressure comprises taking the ratio of the intake manifold pressure to the steady state reference values for manifold pressure at the indicated torque set-point and engine speed, and wherein the step of determining the intake manifold pressure multiplier comprises determining an intake manifold pressure exponential factor; and wherein the step of comparing the intake manifold oxygen concentration to steady state reference values comprises taking the ratio of the estimate of intake manifold oxygen concentration to the steady state reference values for manifold pressure at the indicated torque set-point and engine speed, and wherein the step of determining the intake manifold oxygen concentration multiplier comprises determining an oxygen concentration exponential factor.

10. The method of claim 1, wherein the step of determining the intake manifold pressure multiplier comprises determining an intake manifold pressure exponential factor.

11. The method of claim 10, wherein the step of determining the intake manifold pressure multiplier is further defined in that:

the comparison of intake manifold pressure to steady state reference values for intake manifold pressure is raised to the power of the value represented by the intake manifold pressure exponential factor.

12. The method of claim 11, wherein the step of determining the intake manifold pressure exponential factor is accomplished experimentally.

13. The method of claim 1, wherein the step of determining the intake manifold oxygen concentration multiplier comprises determining an oxygen concentration exponential factor.

14. The method of claim 13, wherein the step of determining the intake manifold oxygen concentration multiplier is further defined in that the comparison of the estimate of intake manifold oxygen concentration to steady state reference values for intake manifold oxygen concentration is raised to the power of the value represented by the intake manifold oxygen concentration exponential factor.

15. The method of claim 14, wherein the step of determining the intake manifold oxygen concentration exponential factor is accomplished experimentally.

16. The method of claim 1, comprising the further step of determining steady state reference ignition delay values based on indicated torque set-point and engine speed; and wherein the step of calculating a compensated start of injection timing is further defined in that the steady state reference ignition delay values are modified by the intake manifold pressure multiplier and the oxygen concentration multiplier to determine the compensated start of injection timing;

wherein the step of calculating a compensated start of injection timing based on reference tabulated ignition delay values further comprises the steps of:

determining a combustion phasing reference crank angle at steady state for the indicated torque set-point and engine speed determined;

determining start of injection angle at steady state for the indicated torque set-point and engine speed determined; and multiplying the difference between the combustion phasing reference crank angle at steady state and the start of injection angle at steady state with the intake manifold pressure multiplier and with the oxygen concentration multiplier.

17. The method of claim 16, wherein the combustion phasing reference crank angle is the crank angle at 50% combustion phasing.

* * * * *